May 18, 1926.

L. D. HOULIS

BAKING OVEN

Filed May 10, 1924  3 Sheets-Sheet 1

1,585,148

Inventor
L. D. Houlis

By Jack A. Ochler
Attorney

May 18, 1926.
L. D. HOULIS
BAKING OVEN
Filed May 10, 1924    3 Sheets-Sheet 2
1,585,148
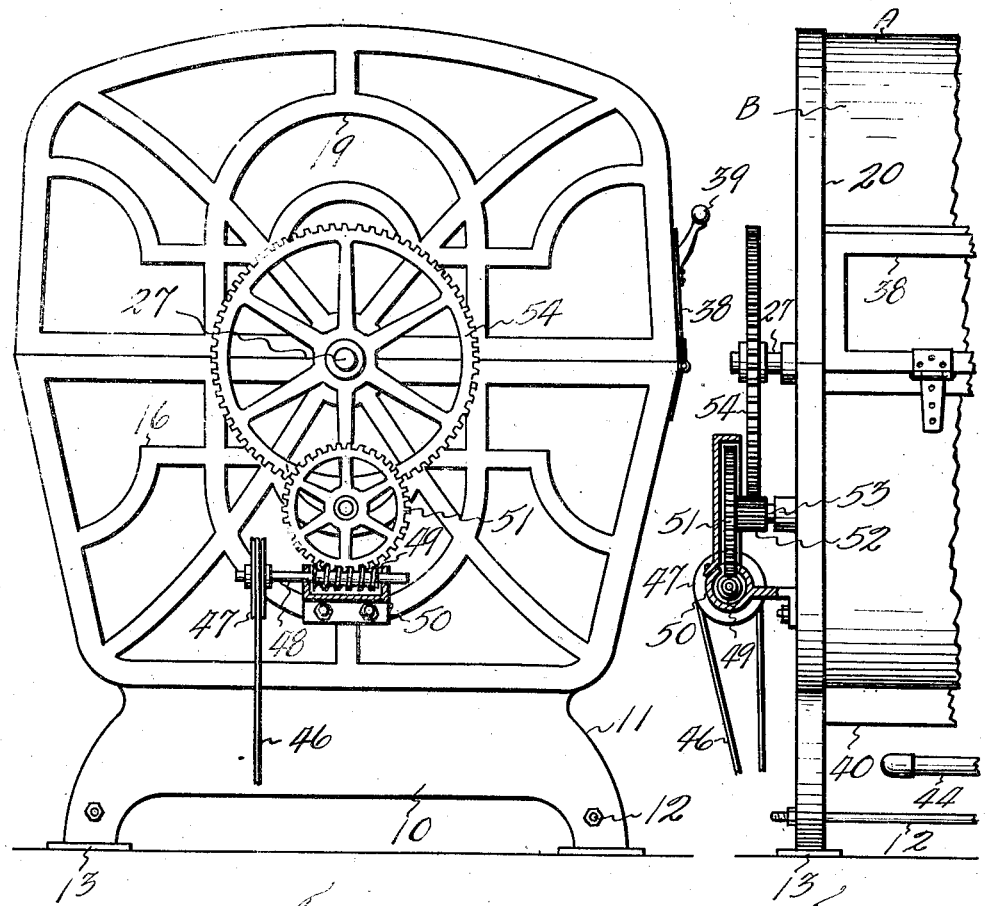
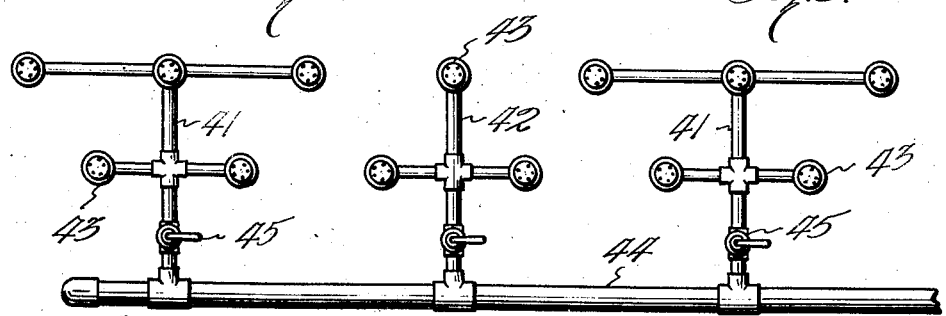
Inventor
L. D. Houlis
By Jack Ashley
Attorney May 18, 1926.  
L. D. HOULIS  
BAKING OVEN  
Filed May 10, 1924   3 Sheets-Sheet 3

1,585,148

Inventor  
L. D. Houlis

By Jack A. Schley  
Attorney

Patented May 18, 1926.

1,585,148

UNITED STATES PATENT OFFICE.

LOUIS D. HOULIS, OF DALLAS, TEXAS.

BAKING OVEN.

Application filed May 10, 1924. Serial No. 712,227.

This invention relates to new and useful improvements in baking ovens.

The invention has to do with that type of oven employing a revolving carrier and used largely by bakers for baking bread. These ovens, especially those analogous to this invention, use gas burners for heating. While these ovens have been successful and are more or less satisfactory, considerable skill and dexterity are required to regulate and control the burners; however it is almost impossible to maintain an even heat so that equal or stabilized baking will be had throughout all parts of the oven. Frequently bread is burned because the heat is more intense in one part of the oven than in the other. Further, frequent manipulation of the gas burners is necessary in an effort to control the heat.

The object of my invention is to provide an oven so shaped as to control the heat to such an extent as to give substantially the same intensity in all parts of the oven.

A particular object of the invention is to provide an oven having its upper portion enlarged transversely, whereby amplified heat pockets or spaces are formed longitudinally on each side of and above the carrier.

Another object of the invention is to provide an oven which may be constructed in units as a skeleton and subsequently covered, whereby the construction and assembly are simplified.

A further object is to provide a multiple burner unit having individual burners disposed to distribute the heat products equally and having front controls, whereby the burners may be segregated into groups and easily regulated.

A still further object of the invention is to provide shelves or tray for the carrier of a particular type, better fitted for stabilized baking and more efficiently mounted.

A construction designed to carry out the invention will be hereinafter described together with other features of the invention.

Figure 1:
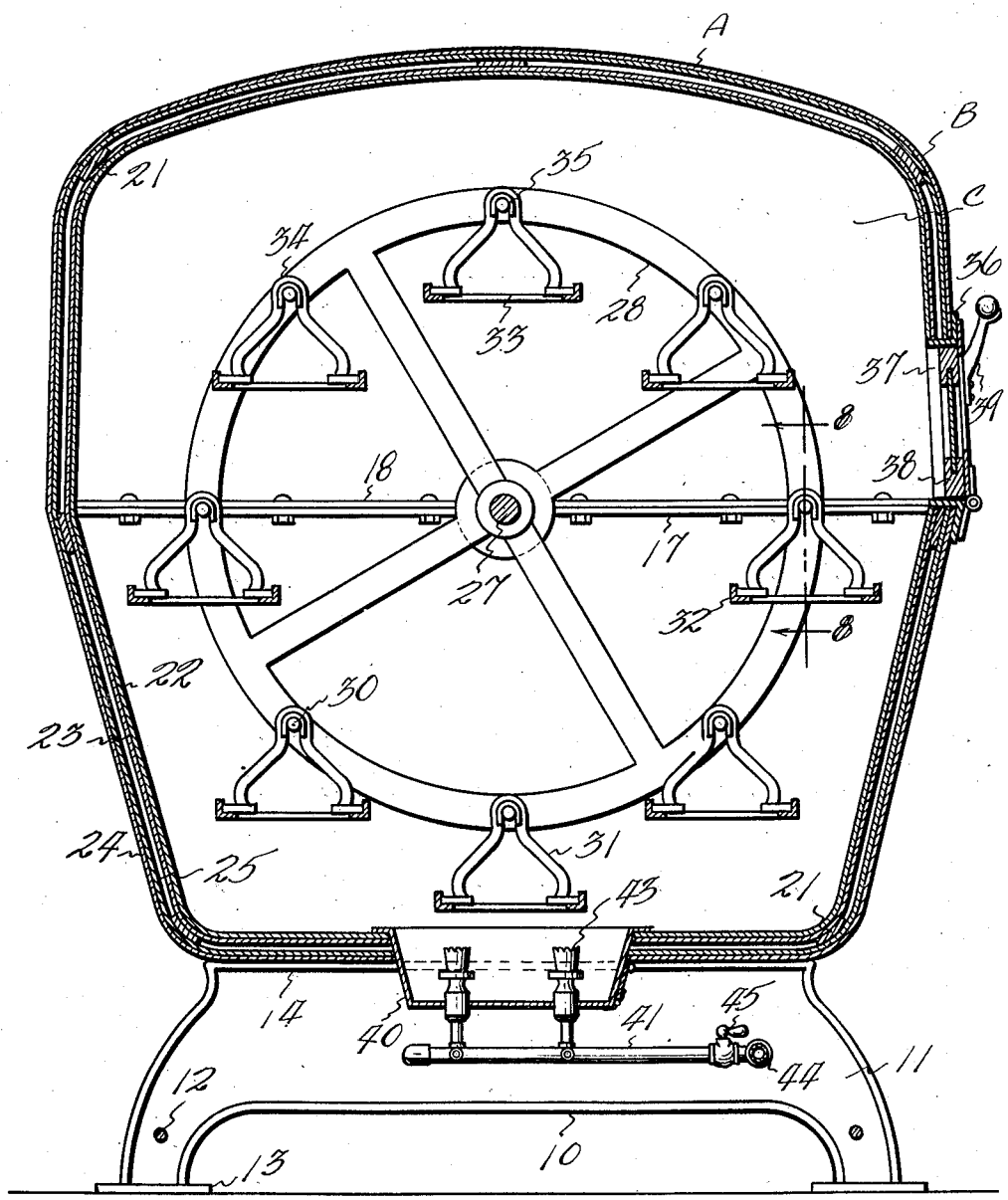
Figure 5:
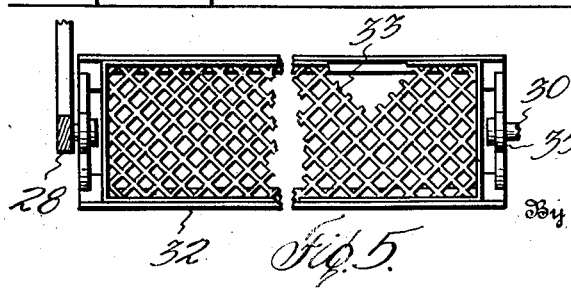
Figure 7:
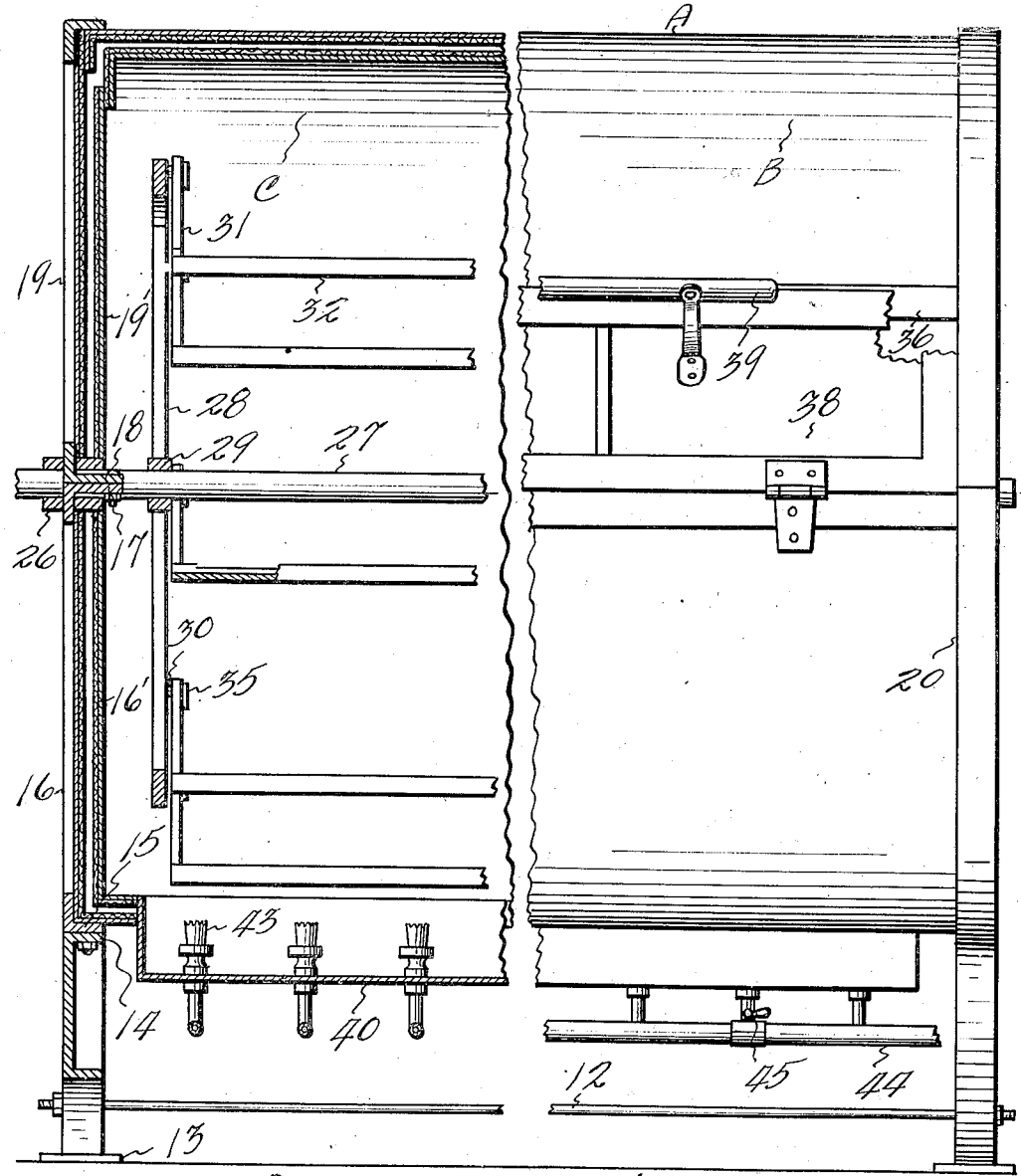
Figure 8:
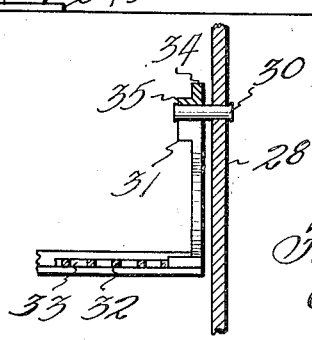

The invention will be more readily understood from a reading of the following specification and by reference to the accompanying drawings, in which an example of the invention is shown, and wherein:

Fig. 1 is a transverse vertical sectional view of an oven constructed in accordance with my invention, Fig. 2 is an end elevation of the same, Fig. 3 is a partial front elevation, Fig. 4 is a plan view of the burner unit, Fig. 5 is a plan view of one of the shelves, Fig. 6 is an enlarged sectional view on the line 6—6 of Fig. 2, Fig. 7 is a fragmentary view, a portion being shown in front elevation and a portion in section, and Fig. 8 is an enlarged vertical sectional view on the line 8—8 of Fig. 1.

In the drawings the numeral 10 designates a base composed of end members 11 connected by tie bars 12 and having feet 13. As is best shown in Figs. 1 and 7 the end members have inwardly directed flanges 14 along their upper edges. To these flanges are bolted the lower flanges 15 of the lower sections 16 of end frames. Upper sections 19 of end frames have lower transverse flanges 18 bolted to flanges 17 on the upper edges of the sections 16.

The end frame sections are suitably mullioned and have inwardly directed marginal flanges 20. The frame sections at one end are connected with those at the other end by longitudinal bars 21, spaced transversely and disposed at vital points. The cover or jacket of the oven is composed of an inner metallic lining 22 having a layer of insulating material 23 and an outer metallic sheath 24 having a layer of insulating material 25. The layers 23 and 25 are disposed on opposite sides of the bars 21, while the sheath is secured to the inner face of the marginal flanges 20. The jacket is thus adequately fastened to the frame, which latter is composed of the parts 16, 19 and 21. This jacket is sufficiently lined with heat insulating material, (23 and 25) such as asbestos and also has a dead-air space between the insulating layers. The end frames are covered with end walls 16' and 19' secured to their inner faces and constructed like the jacket.

The flanges 17 and 18 have provisions at their central portions for receiving bearing boxes 26 in which is mounted a central longitudinal shaft 27. A revolving carrier is mounted on this shaft and comprises circular end spiders 28 having hubs 29 whereby they are fastened on the shaft adjacent the ends of the oven. These spiders have studs 30 alined longitudinally of the oven. Hangers 31 support trays 32 each having a grille 33 fastened therein to form a bottom (Figs. 5 and 8). Each hanger has an inverted yoke 34 at its upper end, centrally of the tray, and provided with an extension 35, whereby an amplified bearing surface is produced. The yokes are engaged on the studs 30 and the trays swing therefrom.

An angle-iron frame 36 surrounds an opening 37 extending longitudinally of the front of the oven at the bottom of the upper section of the oven. Through this opening access to the trays of the revolving carrier, is had. A longitudinal flanged door 38 is hinged to the bottom of the frame 36 so as to swing into said frame. The door has a suitable handle 39.

In the bottom of the oven is provided a central longitudinal trough 40 for the reception of a burner unit. This unit comprises a pair of side manifolds 41 and a central manifold 42 each comprising burners 43 extending up through the bottom of the trough. Each manifold has connection with a common gas supply pipe 44 extending along the front of the oven. Adjacent the point of connection of each manifold with the supply pipe, is a controlling valve 45 within easy reach from the front of the base 10.

The arrangement of the burners and manifolds is very important. The burners of each manifold are arranged on opposite sides of the longitudinal central axis of the carrier as well as being in staggered relation. The end manifolds 41, in the present instance comprises three burners on the rear side and two on the front side; while the central manifold has one burner on the rear side and two on the front side. The burners are all equally spaced apart. As a rule the central or intermediate portion of an oven becomes hottest, therefore the smaller manifold is used at this point, with the view of equalizing the heat. By adjusting the valves 45 the flames of the burners 43 may be regulated and if necessary the flames of the central manifold may be turned very low or extinguished, and sufficient heat supplied by the end manifolds.

Heat of course rises and while the pans carrying the articles being baked are exposed to the direct action of the flames of the burners 43, when passing over the latter, the heat in the upper portion of the usual oven becomes so intense, that the bread or other article being baked, and exposed directly thereto, is frequently burned or baked too quickly. Efforts have been made to overcome this. Some ovens have been provided with vents, but these tend to excessively consume fuel and draw too much cold air into the oven. The usual practice is to manipulate the burners in an endeavor to regulate the heat.

The essential feature of my invention is the shape of the oven or the enlarged upper section. Referring to Fig. 1, it will be seen that the lower section has its front and rear walls diverging upwardly to the transverse center of the carrier. These diverging walls flare outwardly. The front and rear walls of the upper section are nearly vertical, being slightly inclined inwardly. This is done largely to cause the door 38 to remain closed. These upper front and rear walls are merged by wide curved portions A into an arched top B, which is comparatively flat. By this construction amplified heat pockets or chambers C are formed, longitudinally of the oven, at the intersections of the top B and the front and rear walls of the oven. It will be seen that the pockets will provide ample space above the carrier for the accumulation of heated air and the circulation of heat currents. The top or roof and the walls of the pockets are so far removed from the carrier as not to confine the heat too closely. An important feature is that this amplified space makes provision for storing or accommodating of a large volume of heated air contiguous to the upper portion carrier. This arrangement makes for stabilized and even baking and less manipulation of the burners is required.

It is obvious that various means may be employed for driving the shaft 27. I prefer to employ a belt 46 driven by an electric motor (not shown) as the belt drive fails to function. The belt drives a pulley 47 mounted on a shaft 48 carrying a worm 49. The worm is enclosed in a housing bracket 50 secured to the end section 16. The worm drives a worm wheel 51 having a pinion 52 attached to its hub and mounted on a stub shaft 53. The pinion drives a large spur gear 54, whereby the carrier, through its shaft 27, is slowly revolved.

Various changes in the size and shape of the different parts, as well as modifications and alterations may be made within the scope of the appended claims.

What I claim, is:

1. A baking oven of the character described comprising a base having spaced standards, end members secured to each standard, said end members being composed of upper and lower open frame sections, each section being provided with a transverse flange and an inwardly extending peripheral flange, each upper section having its transverse flange secured to the transverse flange of the corresponding lower section, tie bars extending between said end members at spaced points around the periphery thereof, insulated end walls secured within the peripheral flanges of the open frame sections, a jacket secured to the peripheral flanges of said end members and having a heat insulating core, an inner lining supported within said jacket and spaced therefrom by said tie bars, a revolving carrier mounted within the assembled sections, and means for heating the oven.

2. A baking oven of the character described comprising a base having spaced standards, end members secured to each standard, said end members being composed of an upper open frame section having parallel sides and a curved top and a lower open frame section having a horizontal bottom and tapering sides, each section being provided with a transverse flange and an inwardly extending peripheral flange, each upper section having its transverse flange secured to the transverse flange of the corresponding lower section, tie bars extending between said end members at spaced points around the periphery thereof, insulated end walls secured within the peripheral flanges of the open frame sections, a jacket secured to the peripheral flanges of said end members and having a heat insulating core, an inner lining supported within the jacket and spaced therefrom by said tie bars, a revolving carrier mounted within the assembled sections, a burner trough depending from the horizontal base beneath the axis of the carrier, and separately controlled grouped burners disposed at intervals in said trough.

In testimony whereof I affix my signature.

LOUIS D. HOULIS.